United States Patent [19]

Hsiao

[11] Patent Number: 4,953,893
[45] Date of Patent: Sep. 4, 1990

[54] SELF-DETACHABLE BICYCLE AUXILIARY WHEEL BRACKET STRUCTURE

[76] Inventor: K. H. Hsiao, No. 4, Lane 11, Tzu Chiang St., Tu Cheng Shiang, Taipei Shien, Taiwan

[21] Appl. No.: 389,406

[22] Filed: Aug. 4, 1989

[51] Int. Cl.⁵ ............................................. B62H 13/00
[52] U.S. Cl. .................................. 280/293; 248/205.1
[58] Field of Search ............................ 248/205.1, 214; 280/304, 293, 298, 299, 302, 302, 202

[56] References Cited

U.S. PATENT DOCUMENTS

| 1,484,876 | 2/1924 | Dobrowolski | 280/202 |
| 2,682,418 | 6/1954 | Honig | 280/304 |
| 2,784,008 | 3/1957 | Pearl | 280/304 |
| 3,401,954 | 9/1968 | Brilando | 280/293 |
| 3,642,305 | 2/1972 | Pawsat | 280/293 |
| 3,746,367 | 7/1973 | Johannsen | 280/301 |
| 4,326,729 | 4/1982 | Luckowski et al. | 280/304 |
| 4,615,535 | 10/1986 | McMurtrey | 280/293 |

Primary Examiner—Ramon O. Ramirez
Attorney, Agent, or Firm—Bacon & Thomas

[57] ABSTRACT

A self-detachable bicycle auxiliary wheel bracket which can be connected to the free-wheel axle of a bicycle without removing the nut which locks up the free-wheel axle, and comprising an integral recess at the inner top side for receiving therein the nut which locks the free-wheel axle, which recess has a through-hole in the center for insertion therethrough of the bicycle free-wheel axle, and a pair of projecting rods disposed at lateral sides of the recess for inserting into the front notch of the rear fork of the bicycle to stabilize the connection of the bicycle auxiliary wheel bracket to the free-wheel axle.

2 Claims, 4 Drawing Sheets

SELF-DETACHABLE BICYCLE AUXILIARY WHEEL BRACKET STRUCTURE

BACKGROUND OF THE INVENTION

The present invention is related to a self-detachable bicycle auxiliary wheel bracket for connection of an auxiliary wheel to a bicycle.

A regular bicycle auxiliary wheel bracket serves as a connector to connect an auxiliary wheel to the free-wheel of a bicycle so as to stabilize the whole bicycle structure during riding. It is very helpful to little children or the people who start to learn riding a bicycle. Due to some drawbacks in structure, the auxiliary wheel bracket tends to incline during operation and interfere with its function.

FIG. 1 illustrates a kind of auxiliary wheel bracket 1 of the prior art wherein the bracket 1 has an elongated retainer plate 11 connected thereto at the top, which retainer plate 11 has a retainer portion defining therein a notch 12. When the auxiliary wheel bracket 1 is connected to the free-wheel axle of a bicycle, the retainer plate 11 has its notch 12 mounted on the rod 14 of the rear fork 13 of the bicycle. Because the elongated retainer plate 11 extends from the bracket 1 for a certain length, a high moment of resistance will exist between the notch 12 and the locking nut 15 when the bracket 11 is bearing a transverse push force. Therefore, the retainer portion of the notch 12 tends to break away from its engaged position with the rod 14 and cause the bracket 1 to turn aside.

FIG. 2 illustrates another kind of auxiliary wheel bracket according to the prior art wherein the bracket 2 includes a plurality of locking holes 21 having radial threads respectively made thereon, which bracket 2 is mounted on the free-wheel axle 22 and connected to the rear fork 23 by means of a stop plate 24 set at the inner side. The stop plate 24 has radial threads formed thereon and is mounted on the free-wheel axle 22 by means of a screw-joint, and a nut 25 screwed up therewith at the outer side. According to this structure, a high moment of resistance will result between the bracket 2 and the free-wheel axle 22 during rotation of the free-wheel, and damage the engagement of the radial threads between the locking holes 21 and the stop plates 24.

Further, either one of the above-described auxiliary wheel brackets is very difficult to mount onto the free-wheel axle of a bicycle. It requires professional skill to operate. When attaching either type of these brackets, the nut which locks up the rear fork to the free-wheel axle of a bicycle must first be removed, and thereafter reattached to the free-wheel axle after the bracket has been mounted on the free-wheel axle.

According to the above conventional mounting procedure, some disadvantages may be encountered, which may include the following:

1. The free-wheel of the bicycle may deviate from the central position. When the nut which locks up the rear fork onto the free-wheel axle is removed, the free-wheel will immediately break away from the right correct position on the free-wheel axle. After reassembly, the free-wheel may not be properly set to the correct and balanced position. In consequence, the wheel tire tends to wear away.

2. The drive chain tends to become loose. When the nut which locks up the rear fork onto the free-wheel axle is removed from the free-wheel axle, the drive chain will come loose. Since the adjustment of the tension of a bicycle drive chain requires professional technique and tools to achieve, people may neglect or tend not to adjust the tension of the drive chain when the lock nut for free-wheel axle is reattached to the free-wheel axle after having been removed therefrom. Therefore, the drive chain tends to break away from its engaged position with the sprocket.

It is therefore the main object of the present invention to provide a bicycle auxiliary wheel bracket which is simple to mount onto the free-wheel axle of a bicycle without removing the lock nut which locks up the free-wheel axle of the bicycle and which provides a stable connection of an auxiliary wheel to the bicycle.

According to the present invention, a bicycle auxiliary wheel bracket is provided having an integral recess at the inner top side for receiving therein the nut which locks up a bicycle free-wheel axle, which recess includes a through-hole in the center for insertion therethrough of the bicycle free-wheel axle, and a pair of projecting rods disposed at both lateral sides of said recess for respectively inserting into the front notch of the forked connecting end of the rear fork of the bicycle to stabilize the connection of the bicycle auxiliary wheel bracket to the free-wheel axle.

DETAILED DESCRIPTION OF THE PREFERRED EMBODIMENT

Figure 1:
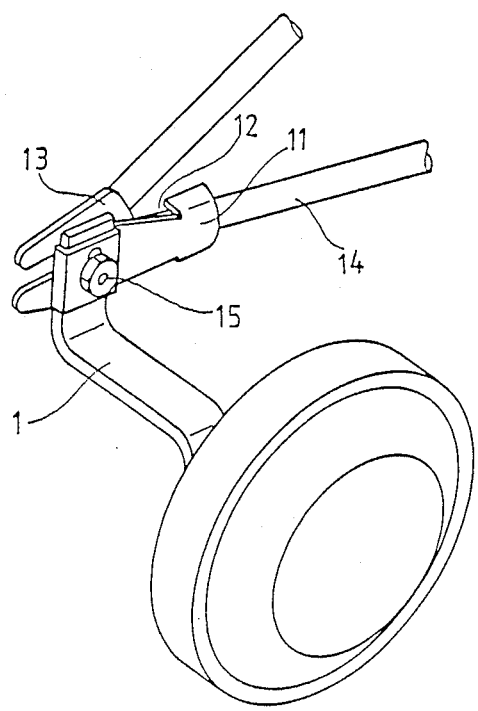
FIG. 1 is a perspective view of an auxiliary wheel assembly according to the prior art.
Figure 2:
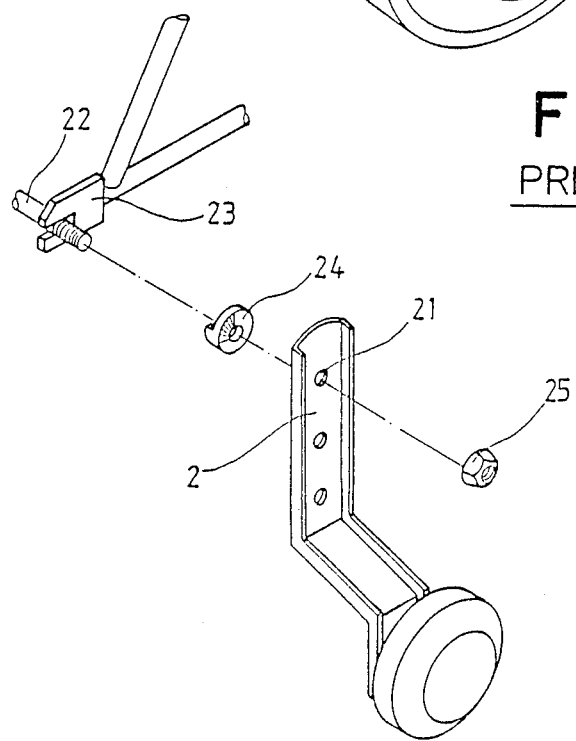
FIG. 2 is a perspective fragmentary view of another auxiliary wheel assembly according to the prior art.
Figure 3:
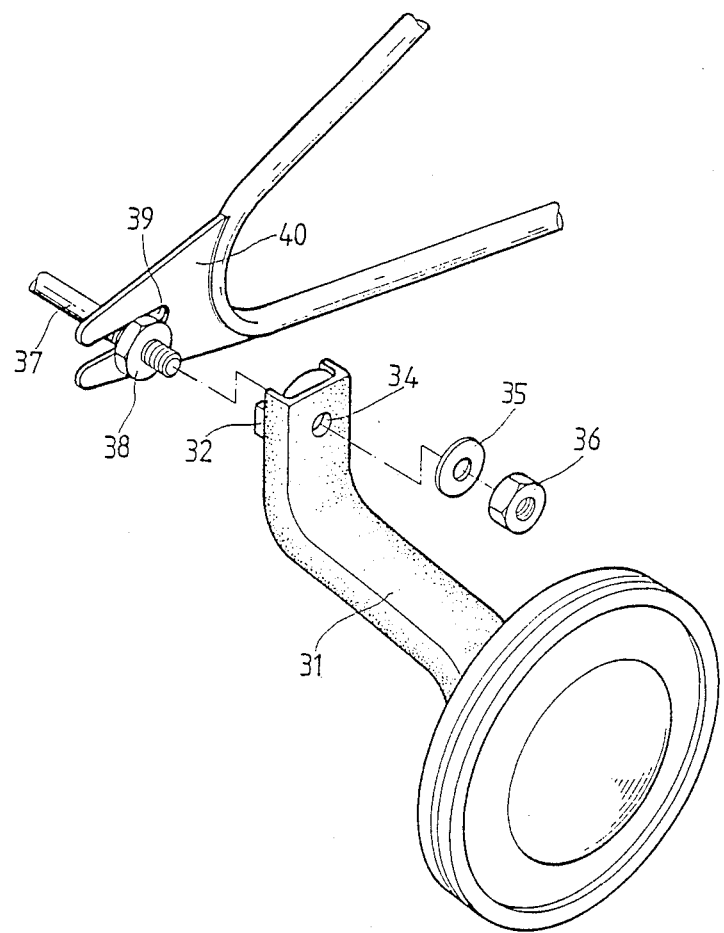
FIG. 3 is a perspective assembly view of an auxiliary wheel assembly embodying the present invention.
Figure 4:
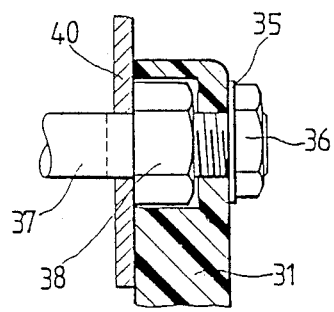
FIG. 4 is a front sectional view of the present invention when it is connected to a free-wheel axle.
Figure 5:
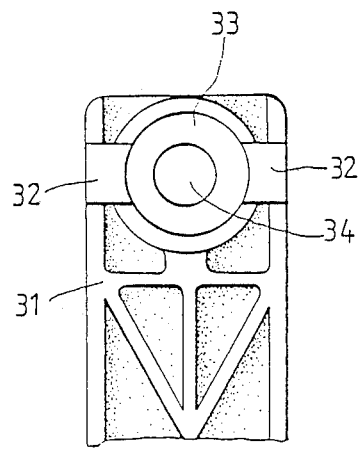
FIG. 5 is a side view of the present invention.
Figure 6:
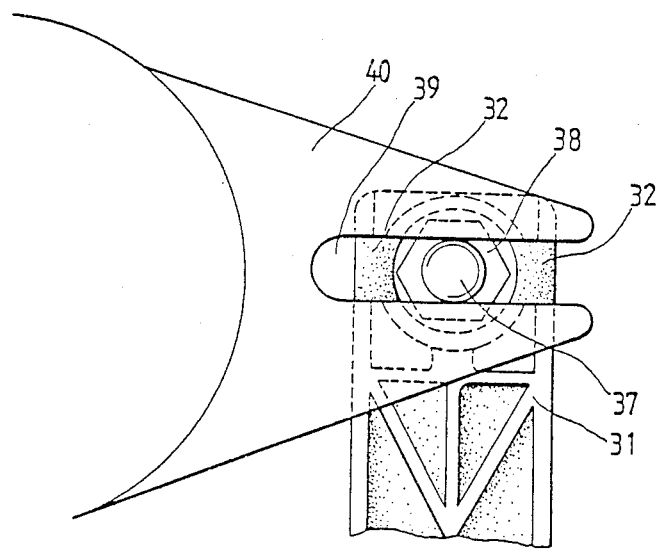
FIG. 6 is a side view of the present invention when it is connected to a free-wheel axle.

Referring to FIG. 3 therein illustrated is an auxiliary wheel assembly constructed according to the present invention and generally comprised of an auxiliary wheel bracket 31, which bracket 31 is includes a recess 33 at the inner top side (as shown in FIG. 5), a pair of projecting rods 32 disposed at both lateral sides of the recess 33, and a through-hole 34 formed in the center of the bottom wall of the recess 33. The diameter of the recess 33 is slighter larger than the nut 38 which locks up the free-wheel axle 37. Therefore, when in assembly, the nut 38 may be received in the recess 33 (as shown in FIG. 4) to let the two projecting rods 32 be respectively inserted into the notch 39 of the rear fork 40. According to the present invention, the two projecting rods 32 are properly arranged in size to perfectly fit it with the front notch 39 of the front connecting end of the rear fork 40 so as to let the auxiliary wheel bracket 31 be firmly connected to the rear fork 40 when they are respectively inserted into the notch 39. Since the free-wheel axle 37 of a bicycle includes a portion thereof protruding beyond the nut 38, the protruding end of the free-wheel axle 37 may be inserted through the through-hole 34 and extend beyond auxiliary wheel bracket 31 for mounting thereon of a washer 35 and a nut 36 to reinforce the connection of the auxiliary wheel bracket 31 to the rear fork 40.

As described above, the arrangement of the recess 33 and the projecting rods 32 can not only stabilize the connection of the auxiliary wheel bracket 31 to the free-wheel axle 37, the recess 33 can also serve as a receiving chamber for receiving therein the nut 38 which locks up the free-wheel axle 37, so as to make facilitate mounting of the auxiliary wheel assembly without having to detach the nut 38.

According to the present invention, the projecting rods 32 are to be set in the front notch 39 of front connecting end of the rear fork 40 to stabilize the connection of the auxiliary wheel bracket 31, and the recess 33 receives therein the nut 38 which locks up the free-wheel axle 37. Therefore, the structure and outer appearance of the projecting rods 32 and the notch 39 may be varied. Recognizing various modifications will be apparent, the scope of the invention shall be deemed to be defined by the claims as set forth below.

I claim:

1. A bracket for detachably securing an auxiliary wheel to a bicycle of the type having a rear fork provided with a front notch formed therein and the threaded end of a free-wheel axle being disposed through the front notch and secured to the rear fork by a nut, with a portion of the threaded end extending outwardly from the nut, which bracket comprises:
   (a) a bracket body having a recess formed therein, the recess being defined by a lateral side wall and a bottom wall; and a through-hole formed in the center of the bottom wall;
   (b) the recess being sized to receive the nut securing the free-wheel axle to the rear fork of a bicycle and permit a portion of the threaded end of the axle extending outwardly of the nut to extend through the through-hole for engagement by a washer and nut assembly to secure the bracket to the axle; and
   (c) a pair of projecting rods extending outwardly from opposite sides of the recess side wall, the rods being engageable within the front notch of the rear fork when the bracket is connected to the axle.

2. The bracket of claim 1 wherein the recess is of a cylindrical configuration and the projecting rods are engageable within the front notch on opposite sides of the axle for stabilizing the connection of the bracket to the axle.

* * * * *